(12) United States Patent
Ieda et al.

(10) Patent No.: US 7,690,491 B2
(45) Date of Patent: Apr. 6, 2010

(54) TWIN-CLUTCH DEVICE

(75) Inventors: Yoshihisa Ieda, Saitama (JP); Akihiko Tomoda, Saitama (JP); Yoshihisa Kanno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 589 days.

(21) Appl. No.: 11/642,637

(22) Filed: Dec. 21, 2006

(65) Prior Publication Data

US 2007/0144856 A1  Jun. 28, 2007

(30) Foreign Application Priority Data

Dec. 28, 2005  (JP) ............................. 2005-377450

(51) Int. Cl.
*F16D 25/08* (2006.01)
*F16D 21/02* (2006.01)

(52) U.S. Cl. ............................... 192/87.11; 192/85 CA

(58) Field of Classification Search ............. 192/85 CA, 192/85.11, 85.15
See application file for complete search history.

(56) References Cited

U.S. PATENT DOCUMENTS

| | | | | | |
|---|---|---|---|---|---|
| 2,578,308 | A | * | 12/1951 | Iavelli | 475/142 |
| 3,011,608 | A | * | 12/1961 | Hansen | 192/85 CA |
| 3,038,575 | A | * | 6/1962 | Hansen | 192/85 CA |
| 3,065,832 | A | * | 11/1962 | Becknell | 192/85 CA |
| 3,444,971 | A | * | 5/1969 | Davidson et al. | 192/85 CA |
| 3,595,353 | A | * | 7/1971 | Beneke | 192/18 A |
| 3,613,848 | A | * | 10/1971 | Reiff | 192/70.28 |
| 3,684,069 | A | * | 8/1972 | Pray | 192/85 CA |
| 3,805,933 | A | * | 4/1974 | Pray | 192/85 CA |
| 5,234,090 | A | * | 8/1993 | Haka | 192/70.252 |
| 5,927,418 | A | * | 7/1999 | Matsuoka | 180/165 |
| 5,931,275 | A | * | 8/1999 | Kasuya et al. | 192/85 CA |
| 6,274,976 | B1 | * | 8/2001 | Ishigaki et al. | 313/466 |
| 7,147,092 | B2 | * | 12/2006 | Friedmann | 192/48.91 |
| 2005/0279605 | A1 | * | 12/2005 | Sowul et al. | 192/48.91 |
| 2007/0034476 | A1 | * | 2/2007 | Braford, Jr. | 192/87.11 |

FOREIGN PATENT DOCUMENTS

| | | |
|---|---|---|
| JP | 2-248724 A | 10/1990 |
| JP | 6-63939 U | 9/1994 |
| JP | 08-277852 A | 10/1996 |
| JP | 8-326850 A | 12/1996 |
| JP | 10-61733 A | 3/1998 |

\* cited by examiner

*Primary Examiner*—Sherry Estremsky
(74) *Attorney, Agent, or Firm*—Birch, Stewart, Kolasch & Birch, LLP

(57) ABSTRACT

A twin-clutch device includes first and second clutch actuating mechanisms; a first clutch disconnection/connection control mechanism for exerting on the first clutch actuating mechanism a controlling force for switching disconnection/connection of the first clutch actuating mechanism; and a second clutch disconnection/connection control mechanism for exerting on the second clutch actuating mechanism a controlling force for switching disconnection/connection of the second clutch actuating mechanism. The first and second clutch disconnection/connection control mechanisms include control actuating members that are supported on a fixing member in a non-rotating state while being allowed to move in a direction along rotation axes of a first driven rotary member and second driven rotary member, the control actuating members being respectively connected to first and second clutch actuating mechanisms via bearings. The clutch so configured reduces the inertial mass by reducing the weight of the rotary portion of the clutch.

14 Claims, 3 Drawing Sheets

TWIN-CLUTCH DEVICE

CROSS-REFERENCE TO RELATED APPLICATION

The present application claims priority under 35 U.S.C. §119 to Japanese Patent Application No. 2005-377450, filed Dec. 28, 2005, the entire contents of which are hereby incorporated by reference.

BACKGROUND OF THE INVENTION

1. Field of the Invention

The present invention relates to a twin-clutch device including a first clutch actuating mechanism having a plurality of first and second friction plates arranged in an alternately overlapping manner, for switching disconnection/connection of power transmission between a driving rotary member and a first driven rotary member and a second clutch actuating mechanism having a plurality of third and fourth friction plates arranged in an alternately overlapping manner, for switching disconnection/connection of power transmission between the driving rotary member and a second driven rotary member. The device also includes a first clutch disconnection/connection control mechanism for exerting on the first clutch actuating mechanism a controlling force for switching disconnection/connection of the first clutch actuating mechanism; and a second clutch disconnection/connection control mechanism for exerting on the second clutch actuating mechanism a controlling force for switching disconnection/connection of the second clutch actuating mechanism.

2. Description of Background Art

A twin-clutch device of this type is already known as disclosed in, for example, JP-A No. H08-277852.

However, the clutch disconnection/connection control mechanism of the twin-clutch device disclosed in JP-A No. H08-277852 mentioned above is adapted to exert a controlling force for switching the disconnection/connection of the clutch actuating mechanism through the application and release of hydraulic pressure to and from the hydraulic pressure chamber formed between members that rotate together with a driving rotary member, so the inertial mass of the rotary portion increases due to oil supplied to the hydraulic pressure chamber. Further, in the case where the hydraulic pressure chamber is formed between members that rotate, a centrifugal force is exerted on the oil within the hydraulic chamber. Accordingly, a mechanism for canceling the hydraulic pressure generated due to the centrifugal force needs to be provided at a position opposed to the hydraulic chamber, which inevitably leads to an increase in weight.

SUMMARY AND OBJECTS OF THE INVENTION

The present invention has been made in view of the above-mentioned circumstances, and accordingly it is an object of the present invention to provide a twin-clutch device in which a reduction in inertial mass is achieved by reducing the weight of a rotary portion, thereby allowing power from a driving rotary member to be efficiently transmitted to the driven rotary member side.

In order to achieve the above-mentioned object, according to a first aspect of the invention, a twin-clutch device includes a first clutch actuating mechanism having a plurality of first and second friction plates arranged in an alternately overlapping manner, for switching disconnection/connection of power transmission between a driving rotary member and a first driven rotary member and a second clutch actuating mechanism having a plurality of third and fourth friction plates arranged in an alternately overlapping manner, for switching disconnection/connection of power transmission between the driving rotary member and a second driven rotary member. Also included are a first clutch disconnection/connection control mechanism for exerting on the first clutch actuating mechanism a controlling force for switching disconnection/connection of the first clutch actuating mechanism; and a second clutch disconnection/connection control mechanism for exerting on the second clutch actuating mechanism a controlling force for switching disconnection/connection of the second clutch actuating mechanism.

The first and second clutch disconnection/connection control mechanisms each include a control actuating member that is supported on a fixing member in a non-rotating state while being allowed to move in a direction along a rotation axis of each of the first driven rotary member and second driven rotary member, the control actuating member of each of the first and second clutch disconnection/connection control mechanisms being connected to each of the first and second clutch actuating mechanisms via a bearing.

Further, according to a second aspect of the invention, in a direction orthogonal to the rotation axes of the first and second driven rotary members that are arranged coaxially, the first and second clutch disconnection/connection control mechanisms are arranged so as to be at least partially overlapped with the first and second clutch actuating mechanisms.

According to a third aspect of the invention, the first and second clutch disconnection/connection control mechanisms each include the control actuating member that forms a hydraulic pressure chamber between the control actuating member and the fixing member, and an urging member interposed between the fixing member and the control actuating member so as to urge the control actuating member in a direction for reducing a volume of the hydraulic pressure chamber.

According to a fourth aspect of the invention, the fixing member is a cover that covers the first and second clutch actuating mechanisms.

According to a fifth aspect of the invention, the first and second clutch actuating mechanisms are arranged in parallel in a direction along rotation axes thereof, and the first and second clutch disconnection/connection control mechanisms are arranged side by side in the direction along the rotation axes.

It should be noted that the first main shaft 7 in the embodiment corresponds to the first driven rotary member according to the present invention, the second main shaft 8 in the embodiment corresponds to the second driven rotary member according to the present invention, the clutch bearings 62, 68 in the embodiment corresponds to the bearing according to the present invention, and the springs 63, 69 in the embodiment correspond to the urging member according to the present invention.

EFFECT OF THE INVENTION

According to the first aspect of the invention, since the first and second clutch disconnection/connection control mechanisms are disposed in a non-rotary portion, the weight of the rotary portion is reduced to achieve a reduction in inertial mass, thereby allowing power from the driving rotary member to be efficiently transmitted to the driven rotary member side.

Further, according to the second aspect of the invention, the twin-clutch device can be made compact with respect to the direction of its rotation axis.

According to the third aspect of the invention, since the hydraulic pressure chamber equipped in each of the first and second clutch disconnection/connection control mechanisms is provided in a non-rotary portion, no centrifugal force is exerted on the oil in the hydraulic chambers. Accordingly, not only is it unnecessary to provide a mechanism for canceling the hydraulic pressure generated due to a centrifugal force, the weight of the rotary portion can be further reduced because the urging member is also provided in the non-rotary portion, thereby achieving a further reduction in inertial mass.

According to the fourth aspect of the invention, the oil passage for introducing oil to the hydraulic chamber can be readily formed in the cover, and as compared with the case where the oil passage is formed within a rotary member, it is possible to simplify and shorten the path of the oil passage, thereby achieving reduced hydraulic pressure loss and reduced machining man-hours.

According to the fifth aspect of the invention, the twin-clutch device can be made compact with respect to its radial direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
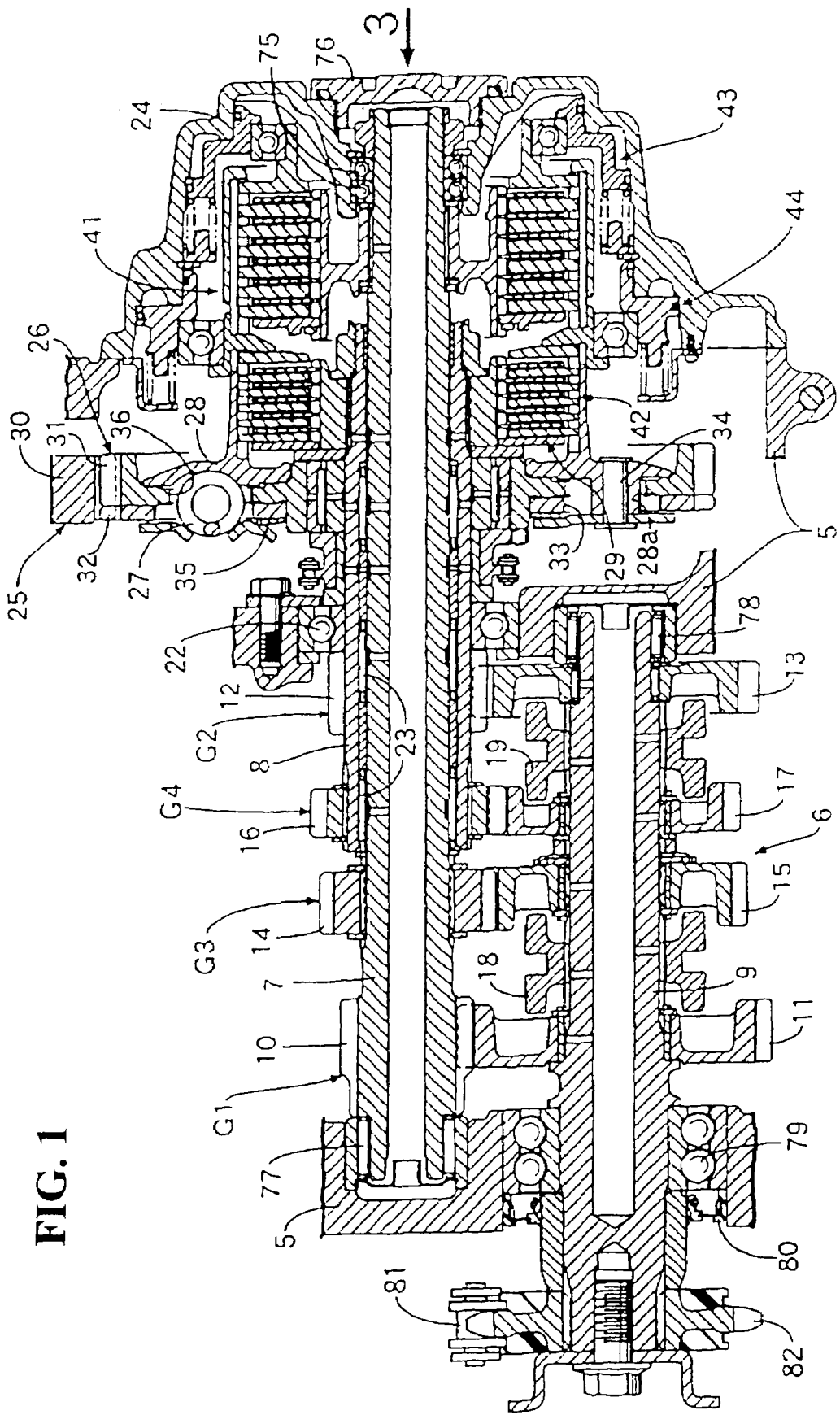
FIG. 1 is a longitudinal sectional view showing a part of an engine.

First, in FIG. 1, for example, a crankcase 5 equipped to an engine mounted to a motorcycle accommodates a transmission 6 including plural speeds of gear trains that can be selectively established, for example, first to fourth-speed gear trains G1, G2, G3, G4. The first-speed gear train G1 includes a first-speed driving gear 10 provided integrally with a first main shaft 7, and a first-speed driven gear 11 rotatably supported on a countershaft 9, which is parallel to the first main shaft 7, and brought into meshing engagement with the first-speed driving gear 10. The second-speed gear train G2 includes a second-speed driving gear 12 provided integrally with a second main shaft 8 that is coaxial with the first main shaft 7, and a second-speed driven gear 13 rotatably supported on the countershaft 9 and brought into meshing engagement with the second-speed driving gear 12. The third-speed gear train G3 includes a third-speed driving gear 14 fixed to the first main shaft 7, and a third-speed driven gear 15 rotatably supported on the countershaft 9 and brought into meshing engagement with the third-speed driving gear 14. The fourth-speed gear train G4 includes a fourth-speed driving gear 16 fixed to the second main shaft 8, and a fourth-speed driven gear 17 rotatably supported on the countershaft 9 and brought into meshing engagement with the fourth-speed driving gear 16.

A first shifter 18 is spline-coupled to the countershaft 9 between the first and third-speed driven gears 11, 15. Through axial movement of the first shifter 18, it is possible to switch between a state in which the first and third-speed driven gears 11, 15 are allowed to freely rotate with respect to the countershaft 9, and a state in which either one of the first and third-speed driven gears 11, 15 is coupled to the countershaft 9 in a relatively non-rotatable manner. Further, a second shifter 19 is spline-coupled to the countershaft 9 between the second and fourth-speed driven gears 13, 17. Through axial movement of the second shifter 19, it is possible to switch between a state in which the second and fourth-speed driven gears 13, 17 are allowed to freely rotate with respect to the countershaft 9, and a state in which either one of the second and fourth-speed driven gears 13, 17 is coupled to the countershaft 9 in a relatively non-rotatable manner.

The intermediate portion of the second main shaft 8 formed in a cylindrical configuration rotatably penetrates the crankcase 5, with a ball bearing 22 being interposed between the crankcase 5 and the second main shaft 8. Further, the first main shaft 7 having a cylindrical configuration penetrates the second main shaft 8 in a relatively rotatable manner while keeping a constant axial position relative to the second main shaft 8, with a plurality of roller bearings 23 being interposed between the first main shaft 7 and the second main shaft 8. Further, one end portion of the first main shaft 7 penetrates a cover 24 that is coupled to the crankcase 5, with a pair of ball bearings 75 being interposed between the one end portion of the first main shaft 7 and the cover 24. A lid member 76 that covers the one end of the first main shaft 7 projecting from the cover 24 is detachably attached to the cover 24 in a fluid-tight manner. Further, the other end portion of the first main shaft 7 is rotatably supported on the crankcase 5 via a roller bearing 77.

One end portion of the countershaft 9 is rotatably supported on the crankcase 5 via a roller bearing 78. The other end portion of the countershaft 9 rotatably penetrates the crankcase 5, with a ball bearing 79 and an annular seal member 80 being interposed between the other end portion of the countershaft 9 and the crankcase 5. A drive sprocket 82 is fixed to the projecting end portion of the countershaft 9 from the crankcase 5 such that a chain 81 for transmitting power to a rear wheel (not shown) is wound thereon.

Incidentally, the power of a crankshaft 25 equipped in the engine is input to a driving rotary member 28 via a primary speed reducer 26 and a damper spring 27. A twin-clutch device 29 according to the present invention is provided between the driving rotary member 28 and each of the first main shaft 7 as a first driven rotary member and the second main shaft 8 as a second driven rotary member.

Figure 2:
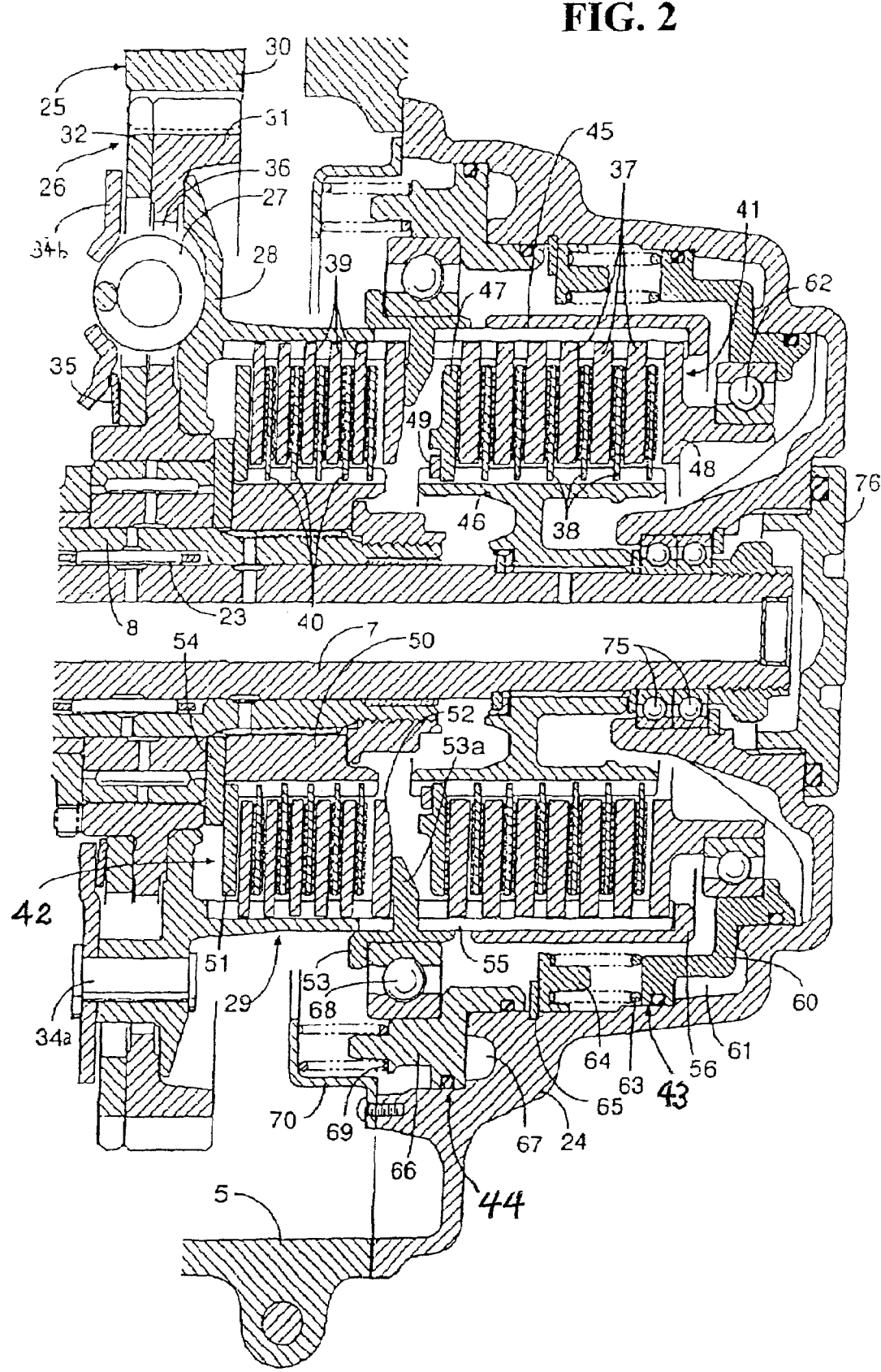
FIG. 2 is an enlarged main portion view of FIG. 1.

Referring also to FIG. 2, the primary speed reducer 26 includes a driving gear 30 provided integrally with the crankshaft 25, a first driven gear 31 that is supported on the second main shaft 8 in a relatively rotatable manner and is brought into meshing engagement with the driving gear 30, and a second driven gear 32 that is supported on the first driven gear 31 so as to be capable of rotating relative to the first driven gear 31 within a limited range to absorb the backlash between the driving gear 30 and the first driven gear 31, and is brought into meshing engagement with the driving gear 30.

The driving rotary member 28 abuts the first driven gear 31 from the side opposite to the second driven gear 32. Connecting bosses 28a that project from a plurality of circumferential locations of the driving rotary member 28 are inserted through elongated holes 33 provided in the first and second driven gears 31, 32 so as to extend in a circumferentially elongated manner. Further, a retainer plate 34b, which is opposed to the second driven gear 32 on the side opposite to the first driven gear 31, is abutted against the end face of the connecting bosses 28a. The retainer plate 34b is abutted against the end face of the connecting bosses 28a by means of rivets 34a passing through each of the connecting bosses 28a. Furthermore, a disc spring 35, which exerts a spring force for bringing the driving rotary member 28 into abutment against the first driven gear 31, is provided between the retainer plate 33 and the second driven gear 32.

Further, circumferentially elongated retention holes 36 are provided in the first and second driven gears 31, 32 at a plurality of locations that are circumferentially offset from the respective elongated holes 33. The damper spring 27, which exerts a spring force for rotating the first and second driven gears 31, 32 relative to each other, is received in each of the retention holes 36 so as to be interposed between the driving rotary member 28 and the retainer plate 34b, and the first and second driven gears 31, 32.

The twin-clutch device 29 includes a first clutch actuating mechanism 41, which has a plurality of first and second friction plates 37, 38 arranged in an alternately overlapping manner and adapted to switch disconnection/connection of the power transmission between the driving rotary member 28 and the first main shaft 7, and a second clutch actuating mechanism 42, which has a plurality of third and fourth friction plates 39, 40 arranged in an alternately overlapping manner and adapted to switch disconnection/connection of the power transmission between the driving rotary member 28 and the second main shaft 8. The first clutch actuating mechanism 41 also includes a first clutch disconnection/connection control mechanism 43 for exerting on the first clutch actuating mechanism 41 a controlling force for switching disconnection/connection of the first clutch actuating mechanism 41, and a second clutch disconnection/connection control mechanism 44 for exerting on the second clutch actuating mechanism 42 a controlling force for switching disconnection/connection of the second clutch actuating mechanism 42.

In addition, the first clutch actuating mechanism 41 includes a clutch outer 45 formed in the shape of a cylinder whose one end is integrally continuous to the driving rotary member 28 and extending coaxially with the first and second main shafts 7, 8 on the side opposite to the primary speed reducer 26, a clutch inner 46 fixed to the first main shaft 7, the plurality of first friction plates 37 that are engaged with the clutch outer 45 in a relatively non-rotatable manner, the plurality of second friction plates 38 that are engaged with the clutch inner 46 in a relatively non-rotatable manner and are arranged alternately with respect to the first friction plates 37. A pressure receiving plate 47 is engaged with the clutch inner 46 in a relatively non-rotatable manner while being opposed to, from among the first and second friction plates 37, 38 that are arranged in a mutually overlapping manner, the friction plate (in this embodiment, the first friction plate 37) arranged at the driving rotary member 28 side end portion, and a pressing plate 48 for compressing the first and second friction plates 37, 38 between the pressing plate 48 and the pressure receiving plate 47. A snap ring 49, which abuts on and engages with the inner periphery of the pressure receiving plate 47 from the side opposite to the first and second friction plates 37, 38, is mounted onto the clutch inner 46.

The second clutch actuating mechanism 42 is arranged side by side with the first clutch actuating mechanism 41 along the direction of the rotation axis of the second clutch actuating mechanism 42. In this embodiment, the second clutch actuating mechanism 42 is arranged between the first clutch actuating mechanism 41 and the driving rotary member 28.

The second clutch actuating mechanism 42 includes the clutch outer 45 that is common to that of the first clutch actuating mechanism 41, a clutch inner 50 fixed to the second main shaft 8, the plurality of third friction plates 39 that are engaged with the clutch outer 45 in a relatively non-rotatable manner, the plurality of fourth friction plates 40 that are engaged with the clutch inner 50 in a relatively non-rotatable manner and are arranged alternately with respect to the third friction plates 39. A pressure receiving plate 51 is engaged with the clutch inner 50 in a relatively non-rotatable manner while being opposed to, from among the third and fourth friction plates 39, 40 that are arranged in a mutually overlapping manner, the friction plate (in this embodiment, the third friction plate 39) arranged at the driving rotary member 28 side end portion, and a pressing plate 52 for compressing the third and fourth friction plates 39, 40 between the pressing plate 52 and the pressure receiving plate 51, and a power transmission member 53 brought into fitting engagement with the clutch outer 45 in a slidable manner and integrally having a plurality of arm portions 53a that abut on the pressing plate 52 from the side opposite to the third and fourth plates 39, 40. A receiving plate 54 that rotates together with the second main shaft 8 and the clutch inner 50 abuts on the pressure receiving plate 52 from the side opposite to the third and fourth friction plates 39, 40.

Slits 55 extending from the axially intermediate portion of the clutch outer 45 to an end portion on the side opposite to the driving rotary member 28 are provided at a plurality of circumferential locations of the clutch outer 45. The arm portions 53a integrally equipped to the power transmission member 53 are inserted through the respective slits 55. Further, upon completing the insertion of the arm portions 53a through the respective slits 55, a reinforcing tube 56 is fitted onto the outer periphery of the clutch outer 45.

The first clutch disconnection/connection control mechanism 43 includes a control actuating member 60 in the form of a stepped cylinder that is supported on the cover 24 as a fixing member in a non-rotating state while being allowed to move in the direction along the rotation axis of the first main shaft 7. The control actuating member 60 is brought into fitting engagement with the inner periphery of the cover 24 in a fluid-tight and slidable manner so as to form an annular first hydraulic pressure chamber 61 between the control actuating member 60 and the cover 24 that covers the first and second clutch actuating mechanisms 41, 42.

The control actuating member 60 is connected to the pressing plate 48 of the first clutch actuating mechanism 41 via a first clutch bearing 62 as a first bearing. As the control actuating member 60 moves in the direction for increasing the volume of the first hydraulic pressure chamber 61 through hydraulic action on the hydraulic pressure chamber 61, the pressing plate 48 is pressed via the first clutch bearing 62, and the first and second friction plates 37, 38 are compressed between the pressure receiving plate 47 and the pressing plate 48. Due to the resulting frictional engagement between the first and second friction plates 37, 38, power is transmitted between the clutch outer 45 and the clutch inner 46, that is, between the driving rotary member 28 and the first main shaft 7.

Further, the first clutch disconnection/connection control mechanism 43 includes springs 63 as urging members interposed between the cover 24 and the control actuating member 60 so as to urge the control actuating member 60 in the direction for reducing the volume of the first hydraulic pressure chamber 61. The springs 63 are provided at a plurality of circumferential locations between a ring-like retainer 64, which is received by a snap ring 65 fitted onto the inner surface of the cover 24, and the control actuating member 60.

In the state with the hydraulic pressure in the first hydraulic pressure chamber 61 released, the control actuating member 60 has moved in the direction for reducing the volume of the first hydraulic pressure chamber 61 due to the spring force of the springs 63. In this state, the first and second friction plates 37, 38 are not in frictional engagement with each other, so the power transmission between the driving rotary member 28 and the first main shaft 7 is cut off.

The second clutch disconnection/connection control mechanism 44 includes a control actuating member 66 in the form of a stepped cylinder that is supported on the cover 24 in a non-rotating state while being allowed to move in the direction along the rotation axis of the second main shaft 8. The control actuating member 66 is brought into fitting engagement with the inner periphery of the cover 24 in a fluid-tight and slidable manner so as to form an annular second hydraulic pressure chamber 67 between the control actuating member 66 and the cover 24.

The control actuating member 66 is connected to the power transmission chamber 53 of the second clutch actuating mechanism 42 via a second clutch bearing 68 as a second bearing. As the control actuating member 66 moves in the direction for increasing the volume of the second hydraulic pressure chamber 67 through hydraulic action on the hydraulic pressure chamber 67, the pressing plate 52 is pressed via the second clutch bearing 68, and the third and fourth friction plates 39, 40 are compressed between the pressure receiving plate 51 and the pressing plate 52. Due to the resulting frictional engagement between the third and fourth friction plates 39, 40, power is transmitted between the clutch outer 45 and the clutch inner 50, that is, between the driving rotary member 28 and the second main shaft 8.

Further, the second clutch disconnection/connection control mechanism 44 includes springs 69 as urging members interposed between the cover 24 and the control actuating member 66 so as to urge the control actuating member 66 in the direction for reducing the volume of the second hydraulic pressure chamber 67. The springs 69 are provided at a plurality of circumferential locations between a ring-like retainer 70, which is fixed to the cover 24, and the control actuating member 66.

In the state with the hydraulic pressure in the second hydraulic pressure chamber 67 released, the control actuating member 63 has moved in the direction for reducing the volume of the second hydraulic pressure chamber 67 due to the spring force of the springs 69. In this state, the third and fourth friction plates 39, 40 are not in frictional engagement with each other, so the power transmission between the driving rotary member 28 and the second main shaft 8 is cut off.

The first and second clutch actuating mechanisms 41, 42 are arranged coaxially with the first and second main shafts 7, 8. In this regard, in the direction orthogonal to the rotation axes of the first and second main shafts 7, 8, the first and second clutch disconnection/connection control mechanism 43, 44 are arranged so as to be at least partially overlapped with the first and second clutch actuating mechanisms 41, 42. In this embodiment, the first and second clutch disconnection/connection control mechanism 43, 44 are arranged so as to be partially overlapped with the first and second clutch actuating mechanisms 41, 42.

Furthermore, while the first and second clutch actuating mechanisms 41, 42 are arranged in parallel in the direction along the rotation axes thereof, the first and second clutch disconnection/connection control mechanism 43, 44 are also arranged side by side in the direction along the above-mentioned rotation axes.

Figure 3:
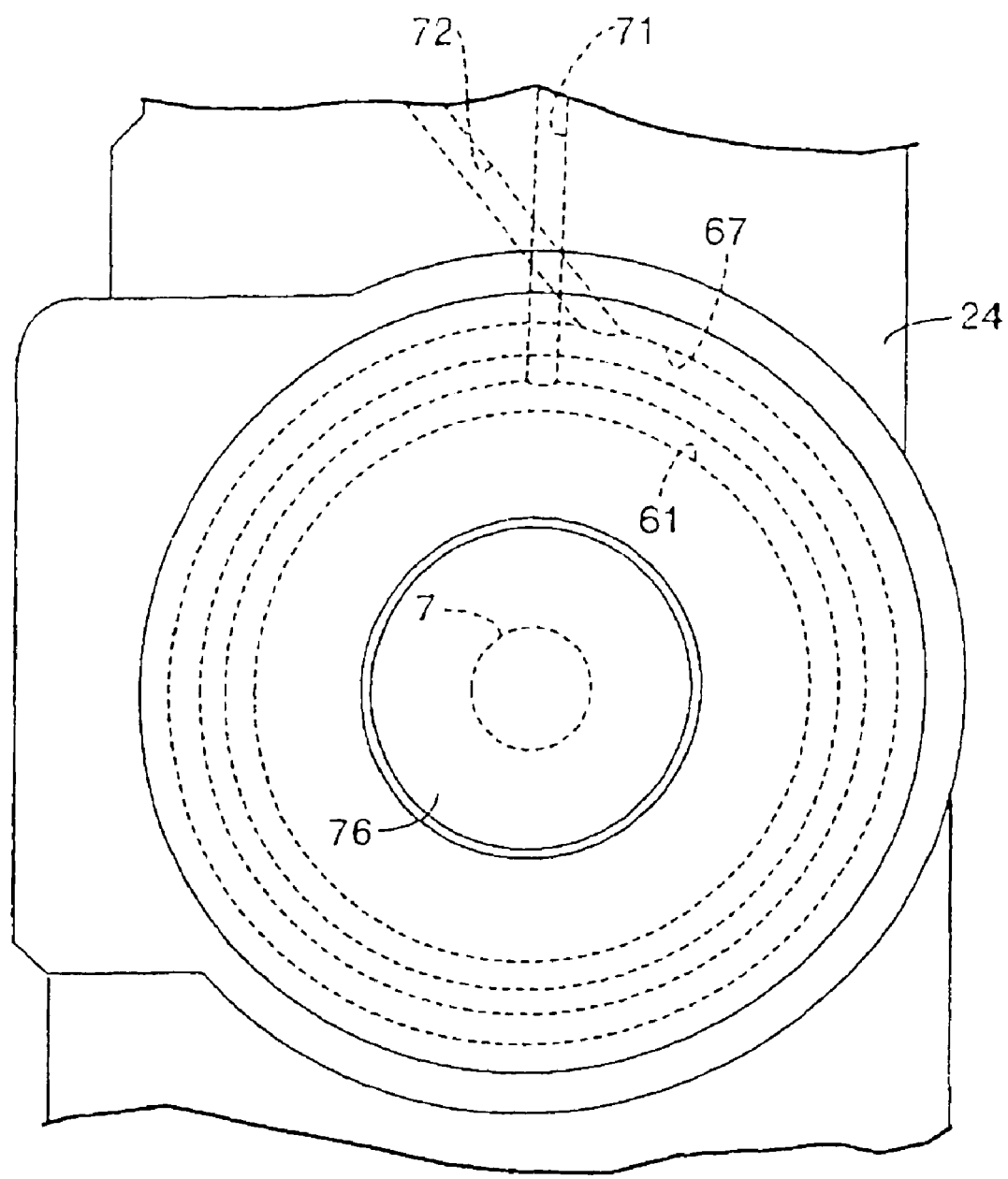
FIG. 3 is a view as seen from the arrow 3 of FIG. 1.

In FIG. 3, an oil passage 71 that communicates with the hydraulic pressure chamber 61 of the first clutch disconnection/connection control mechanism 43, and an oil passage 72 that communicates with the hydraulic pressure chamber 67 of the second clutch disconnection/connection control mechanism 44 are provided in the cover 24. The oil passages 71, 72 are arranged so as to cross each other as seen in the direction along the axes of the first and second main shafts 7, 8.

Next, operation according to this embodiment will be described. The first clutch connection/disconnection control mechanism 43 for exerting on the first clutch mechanism 41 a controlling force for switching the disconnection/connection of the first clutch actuating mechanism 41, and the second clutch connection/disconnection control mechanism 44 for exerting on the second clutch mechanism 42 a controlling force for switching the disconnection/connection of the second clutch actuating mechanism 42, include the control actuating members 60, 66 that are supported on the cover 24 in a non-rotating state while being allowed to move in the direction along the rotation axes of the first and second main shafts 7, 8, respectively. The control actuating members 60, 66 are connected to the first and second clutch actuating mechanisms 41, 42 via the clutch bearings 62, 68, respectively.

Accordingly, the first and second clutch disconnection/connection control mechanisms 43, 44 are disposed in a non-rotary portion, whereby the weight of the rotary portion can be reduced to reduce the inertial mass of the twin-clutch device 29, thus allowing power from the driving rotary member 28 to be efficiently transmitted to the first and second main shafts 7, 8 side.

Incidentally, at the time of changing gears, the disconnection/connection states of the first and second clutch actuating mechanisms 41, 42 are alternately changed, and the establishing states of the first to fourth-speed gear trains G1 to G4 in the transmission 6 are sequentially changed through the movement of the first and second shifters 18, 19. For example, when changing the first gear, the first clutch actuating mechanism 41 is in the connected state, whereas the second clutch actuating mechanism 42 is in the disconnected state. At this time, to change from the first gear to the second gear, the second shifter 19 is moved in the direction for engagement with the second-speed driven gear 13. At this time, while the second shifter 19 is rotating together with the countershaft 9, since the second clutch actuating mechanism 42 is in the disconnected state, the second-speed driven gear 13 is in the dragging state following the rotation of the first clutch actuating mechanism 41, so a difference in RPM occurs between the second shifter 19 and the second-speed driven gear 13.

Accordingly, if the inertial mass of the second clutch actuating mechanism 42 is large, the amount of energy generated upon the engagement of the second shifter 19 with the second-speed driven gear 13 is large, causing a shift shock. In this regard, since the weight of the rotary portion in the twin-clutch device 29 is reduced to thereby reduce the inertial mass as described above, the shift shock resulting from the movement of the first and second shifters 18, 19 can be reduced.

Further, since the first and second clutch disconnection/connection control mechanisms 43, 44 are arranged so as to be at least partially overlapped with the first and second clutch actuating mechanisms 41, 42 in the direction orthogonal to the rotation axes of the first and second main shafts 7, 8 that are arranged coaxially, the twin-clutch device 29 can be made compact with respect to the direction of the rotation axes. Further, since the first and second clutch actuating mechanisms 41, 42 are arranged in parallel in the direction along the rotation axes thereof, and the first and second clutch disconnection/connection control mechanisms 43, 44 are arranged side by side in the direction along the above-mentioned rotation axes, the twin-clutch device 29 can be made compact with respect to its radial direction.

Further, the first and second clutch disconnection/connection control mechanisms 43, 44 include the control actuating members 60, 66 that form the hydraulic chambers 61, 67 between the control actuating members 60, 66 and the cover 24, and the springs 63, 69 interposed between the cover 24 and the control actuating members 60, 66 so as to urge the control actuating members 60, 66 in the direction for reducing the volumes of the hydraulic pressure chambers 61, 67, respectively. Since the hydraulic pressure chambers 61, 67 equipped in the first and second clutch disconnection/connection control mechanisms 43, 44 are provided in a non-rotary portion, no centrifugal force is exerted on the oil in the hydraulic chambers 61, 67. Accordingly, not only is it unnecessary to provide a mechanism for canceling the hydraulic pressure generated due to a centrifugal force, the weight of the rotary portion can be further reduced because the springs 63, 69 are also provided in the non-rotary portion, thereby achieving a further reduction in inertial mass.

Further, since the hydraulic pressure chambers 61, 67 are formed between the cover 24, which covers the first and second clutch actuating mechanisms 41, 42, and the control actuating members 60, 66, the oil passages 71, 72 for introducing oil to the hydraulic pressure chambers 61, 67 can be readily formed in the cover 24. Further, as compared with the case where the oil passages are formed within a rotary member, it is possible to simplify and shorten the path of the oil passages 71, 72, thereby achieving reduced hydraulic pressure loss and reduced machining man-hours.

While an embodiment of the present invention have been described in the foregoing, the present invention is not limited to the above-mentioned embodiment. Various design modifications may be made to the present invention without departing from the scope of the present invention as defined in the claims.

What is claimed is:

1. A twin-clutch device comprising:
    a first clutch actuating mechanism having a plurality of first and second friction plates arranged in an alternately overlapping manner, for switching disconnection/connection of power transmission between a driving rotary member and a first driven rotary member;
    a second clutch actuating mechanism having a plurality of third and fourth friction plates arranged in an alternately overlapping manner, for switching disconnection/connection of power transmission between the driving rotary member and a second driven rotary member;
    a first clutch disconnection/connection control mechanism for exerting on the first clutch actuating mechanism a controlling force for switching disconnection/connection of the first clutch actuating mechanism; and
    a second clutch disconnection/connection control mechanism for exerting on the second clutch actuating mechanism a controlling force for switching disconnection/connection of the second clutch actuating mechanism,
    wherein the first and second clutch disconnection/connection control mechanisms each include a control actuating member that is supported on a fixing member in a non-rotating state while being allowed to move in a direction along a rotational axis of each of the first driven rotary member and second driven rotary member, the control actuating member of each of the first and second clutch disconnection/connection control mechanisms being connected to each of the first and second clutch actuating mechanisms via a bearing,
    wherein the first and second clutch actuating mechanisms are arranged in parallel in a direction along rotational axes thereof, and the first and second clutch disconnection/connection control mechanisms are arranged side by side in the direction along the rotational axes.

2. The twin-clutch device according to claim 1, wherein in a direction orthogonal to the rotation axes of the first and second driven rotary members that are arranged coaxially, the first and second clutch disconnection/connection control mechanisms are arranged so as to be at least partially overlapped with the first and second clutch actuating mechanisms.

3. The twin-clutch device according to claim 2, wherein the first and second clutch disconnection/connection control mechanisms each include the control actuating member that forms a hydraulic pressure chamber between the control actuating member and the fixing member, and an urging member interposed between the fixing member and the control actuating member so as to urge the control actuating member in a direction for reducing a volume of the hydraulic pressure chamber.

4. The twin-clutch device according to claim 2, wherein the fixing member is a cover that covers the first and second clutch actuating mechanisms.

5. The twin-clutch device according to claim 1, wherein the first and second clutch disconnection/connection control mechanisms each include the control actuating member that forms a hydraulic pressure chamber between the control actuating member and the fixing member, and an urging member interposed between the fixing member and the control actuating member so as to urge the control actuating member in a direction for reducing a volume of the hydraulic pressure chamber.

6. The twin-clutch device according to claim 5, wherein the fixing member is a cover that covers the first and second clutch actuating mechanisms.

7. The twin-clutch device according to claim 1, wherein the fixing member is a cover that covers the first and second clutch actuating mechanisms.

8. A twin-clutch device comprising:
    a first clutch actuating mechanism having a plurality of first and second friction plates arranged in an alternately overlapping manner, for switching disconnection/connection of power transmission between a driving rotary member and a first driven rotary member;
    a second clutch actuating mechanism having a plurality of third and fourth friction plates arranged in an alternately overlapping manner, for switching disconnection/connection of power transmission between the driving rotary member and a second driven rotary member;
    a first clutch disconnection/connection control mechanism for exerting on the first clutch actuating mechanism a controlling force for switching disconnection/connection of the first clutch actuating mechanism; and
    a second clutch disconnection/connection control mechanism for exerting on the second clutch actuating mechanism a controlling force for switching disconnection/connection of the second clutch actuating mechanism,
    wherein the first and second clutch disconnection/connection control mechanisms each include a control actuating member that is supported on a fixing member in a non-rotating state while being allowed to move in a direction along a rotational axis of each of the first driven rotary member and second driven rotary member, the control actuating member of each of the first and second clutch disconnection/connection control mechanisms being connected to each of the first and second clutch actuating mechanisms via a bearing, wherein each of the control actuating members is formed as a stepped cylinder, wherein in a direction orthogonal to the rotational axes of the first and second driven rotary members that are arranged coaxially, the first and second clutch disconnection/connection control mechanisms are arranged so as to be at least partially overlapped with the first and second clutch actuating mechanisms.

9. The twin-clutch device according to claim 8, wherein the first and second clutch disconnection/connection control mechanisms each include the control actuating member that forms a hydraulic pressure chamber between the control actuating member and the fixing member, and an urging member interposed between the fixing member and the control actuating member so as to urge the control actuating member in a direction for reducing a volume of the hydraulic pressure chamber.

10. The twin-clutch device according to claim 9, wherein the fixing member is a cover that covers the first and second clutch actuating mechanisms.

11. The twin-clutch device according to claim 8, wherein the fixing member is a cover that covers the first and second clutch actuating mechanisms.

12. The twin-clutch device according to claim 8, wherein the first and second clutch actuating mechanisms are arranged in parallel in a direction along rotation axes thereof, and the first and second clutch disconnection/connection control mechanisms are arranged side by side in the direction along the rotation axes.

13. A twin-clutch device comprising:
a first clutch actuating mechanism having a plurality of first and second friction plates arranged in an alternately overlapping manner, for switching disconnection/connection of power transmission between a driving rotary member and a first driven rotary member;

a second clutch actuating mechanism having a plurality of third and fourth friction plates arranged in an alternately overlapping manner, for switching disconnection/connection of power transmission between the driving rotary member and a second driven rotary member;

a first clutch disconnection/connection control mechanism for exerting on the first clutch actuating mechanism a controlling force for switching disconnection/connection of the first clutch actuating mechanism; and a second clutch disconnection/connection control mechanism for exerting on the second clutch actuating mechanism a controlling force for switching disconnection/connection of the second clutch actuating mechanism, wherein the first and second clutch disconnection/connection control mechanisms each include a control actuating member that is supported on a cover in a non-rotating state while being allowed to move in a direction along a rotational axis of each of the first driven rotary member and second driven rotary member, the control actuating member of each of the first and second clutch disconnection/connection control mechanisms being connected to each of the first and second clutch actuating mechanisms via a bearing, wherein a lid member that covers one end of the first rotary driven member projecting from the cover is detachably attached to the cover in a fluid-tight manner.

14. The twin-clutch device according to claim 13, wherein in a direction orthogonal to the rotational axes of the first and second driven rotary members that are arranged coaxially, the first and second clutch disconnection/connection control mechanisms are arranged so as to be at least partially overlapped with the first and second clutch actuating mechanisms.

* * * * *